UNITED STATES PATENT OFFICE.

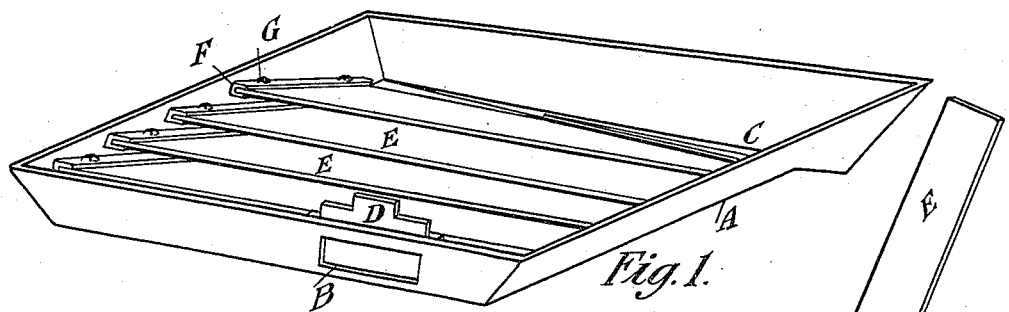
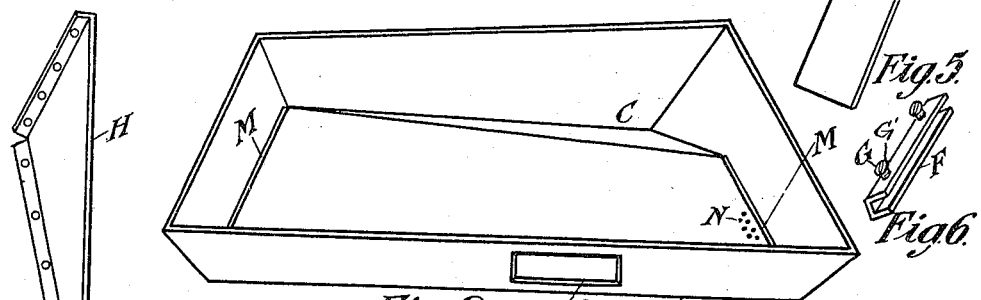
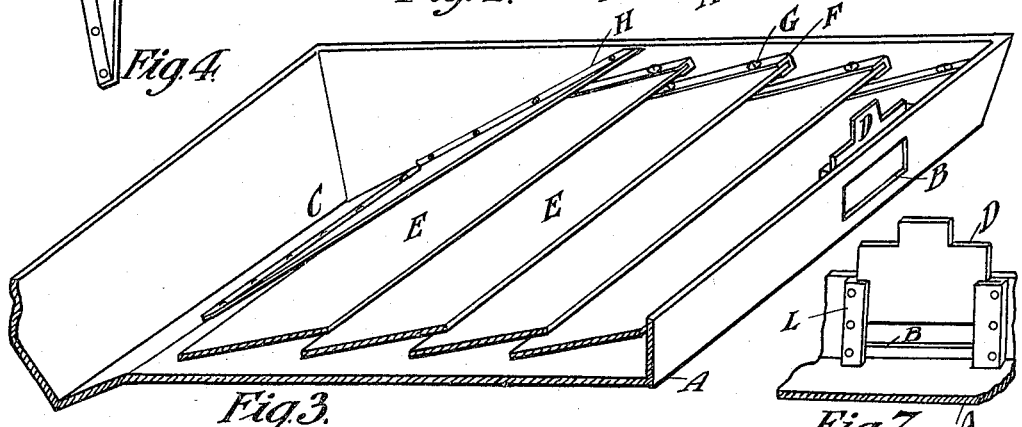
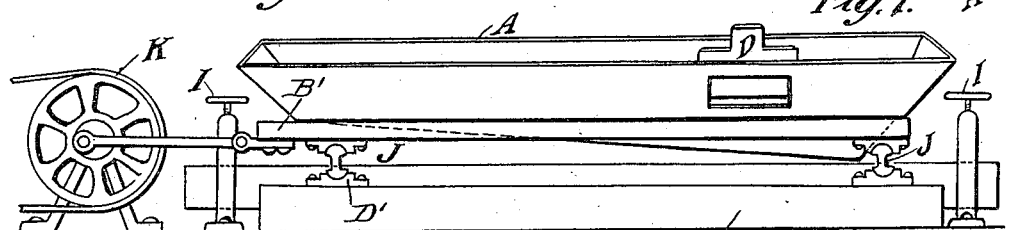

SHERMAN L. WINCHESTER, OF WEISER, IDAHO.

GOLD-SAVING PAN.

1,240,396.  Specification of Letters Patent.  Patented Sept. 18, 1917.

Application filed June 9, 1915. Serial No. 33,211.

*To all whom it may concern:*

Be it known that I, SHERMAN L. WINCHESTER, a citizen of the United States, residing at Weiser, Washington county, Idaho, have invented a new and useful Gold-Saving Pan to be Used in Mining and Extracting Gold and other Precious Metals from Ore and other Substances, of which the following is a specification.

This invention relates to gold saving pans, and particularly to pans used in recovering floured quick silver which escapes from any kind of pulverizer used to recover fine as well as coarse gold, and to prepare it for such recovery through agencies hereinafter mentioned, and to stop and amalgamate platinum, copper and silver, or any other precious metal in its metallic state that can be collected by amalgamation.

In the drawings Figure 1 is a perspective view of the gold saving pan; Fig. 2 is a perspective view of the pan with the plates E removed; Fig. 3 is a sectional view showing the manner in which the plates E are supported; Fig. 4 is a detailed view of an extension side piece used in connection with the pan; Fig. 5 is a detailed view of one of the plates E; Fig. 6 is a perspective view of one of the securing elements which support the plates E; Fig. 7 is a perspective view of a portion of the pan with the door D partly open; and Fig. 8 is a side elevational view of the pan and means for supporting the same in operation.

Referring now more specifically to the drawings the letter A indicates the pan proper, the same being provided with side and end walls, the bottom thereof being provided with a depressed portion C, the depressed portion being for the purpose of receiving the material under operation.

Secured to the side walls of the pan A are substantially U-shaped members F arranged in stepped relation with each other and having threaded openings G' to receive the clamping elements G, which are in the form of screws and adapted to be adjusted within the threaded openings G'. These members F are arranged directly opposite each other and in such position that the same will receive the opposite ends of the plates E which form important elements of the invention, since in the operation of the pan the fluid containing the material under operation is slushed about within the pan, the fine particles lodging between the plates E adjacent the bottom of the pan while the remaining material passes out through the opening B provided in one end of the pan. As clearly shown by Fig. 7, the walls adjacent the opening B are provided with guides L which receive the sliding door member D, whereby the opening may be closed or regulated according to the amount of material flowing into the pan.

The extension member H is secured to the walls of the pan and provides a guard to prevent material held in the pan and being operated upon from being slushed or thrown therefrom during the operation. While the plates E are supported at an angle with relation to the bottom of the pan, they are also held in spaced relation therewith to allow the heavy products of the material to pass thereunder. The flow of pulp underneath and against the plates E causes eddies in the current on the underside, which carry the fine particles of material to the underside of the floating plates, where they are caught by the mercury, which covers the plates E in a heavy plating. The same action takes place upon the top sides of the plates, as regards any light of floating particles of amalgamable matter or materials.

The means for supporting the pan as shown in Fig. 8 comprises a base portion A' and a member B' supported thereabove, by means of the connecting elements J which are seated in suitable bearings E' to permit the same to be freely moved backward and forward by any suitable power. As clearly shown in this figure the pan A rests on the member B'.

The agitation of the pan is for the purpose of keeping the pulp loose and thin so that all heavy particles may settle to the bottom readily. This motion is an end throw of one inch made by an eccentric or shaft (as shown in Fig. 7 at K) which has a motion of 100 R. P. M.

The operation of the pan is as follows: The pulp is fed into the machine at the lower depression of the pan where the heavy particles sink and are washed among the other particles of pulp until forced up and out of the shallow end of the feed trough through their gravity to the level plate or extension member H where the product is again washed and cleaned before it passes to the waste end of the machine. The heavy particles never leave the lower end of the feed trough, since this portion is lower and deeper than any other part of the pan. This feature, itself, collects almost all of the floured quick silver and cleans all that is found and places it back in its liquid state.

I claim:

1. A gold saving pan comprising side and end walls, a bottom therefor, a receiving pocket formed in the bottom of the pan adjacent one end thereof, the pocket being deeper at one end than at the other, an extension plate secured to one of the side walls of the pan adjacent one end of the pocket, plates suspended within the pan and being spaced from the bottom thereof, and means for reciprocating the pan.

2. In a gold saving pan comprising side and end walls, a bottom for said pan, a receiving pocket formed in the bottom adjacent one end thereof, a triangular shaped extension plate secured within the pan adjacent one edge of the pocket, transversely suspended plates positioned within the pan and spaced from the bottom thereof, means for reciprocating the pan and said pan having an opening at one end for exhausting material therefrom.

SHERMAN L. WINCHESTER.

Witnesses:
J. W. GALLOWAY,
JAMES HARRIS.